June 29, 1965  G. D. HIXON  3,191,573
OUTBOARD MOTOR MOUNTING DEVICE
Filed May 21, 1962

INVENTOR.
GEORGE D. HIXON
BY
Eugene C. Knoblock
ATTORNEY

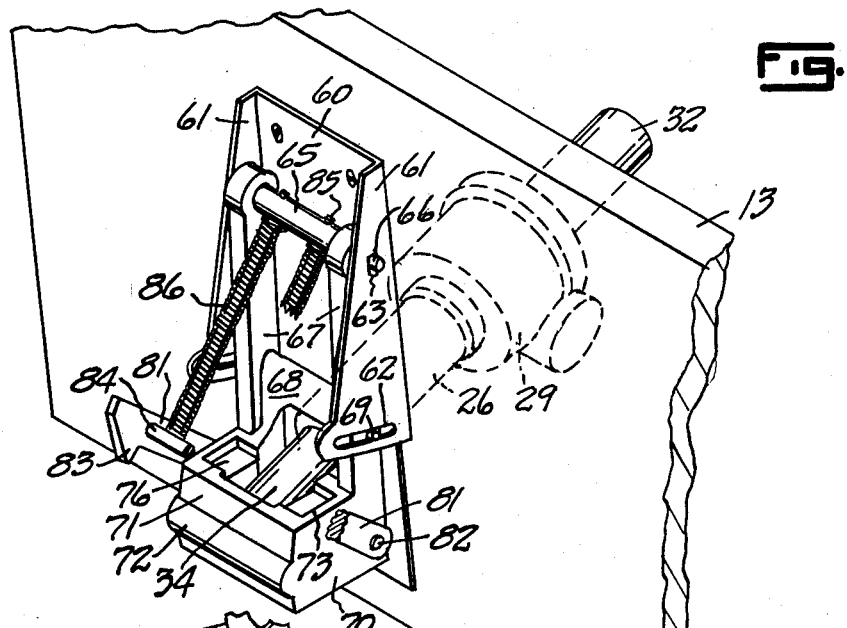
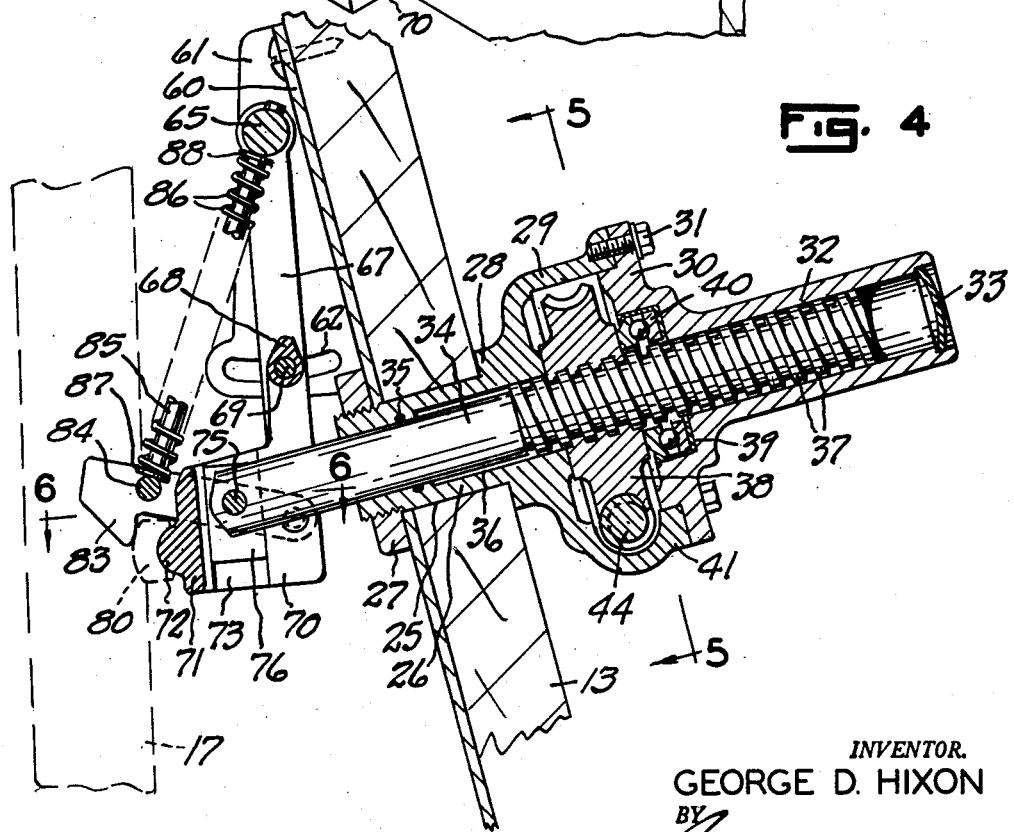

June 29, 1965   G. D. HIXON   3,191,573
OUTBOARD MOTOR MOUNTING DEVICE
Filed May 21, 1962   4 Sheets-Sheet 3

*INVENTOR.*
GEORGE D. HIXON
BY
ATTORNEY

June 29, 1965     G. D. HIXON     3,191,573
OUTBOARD MOTOR MOUNTING DEVICE
Filed May 21, 1962     4 Sheets-Sheet 4
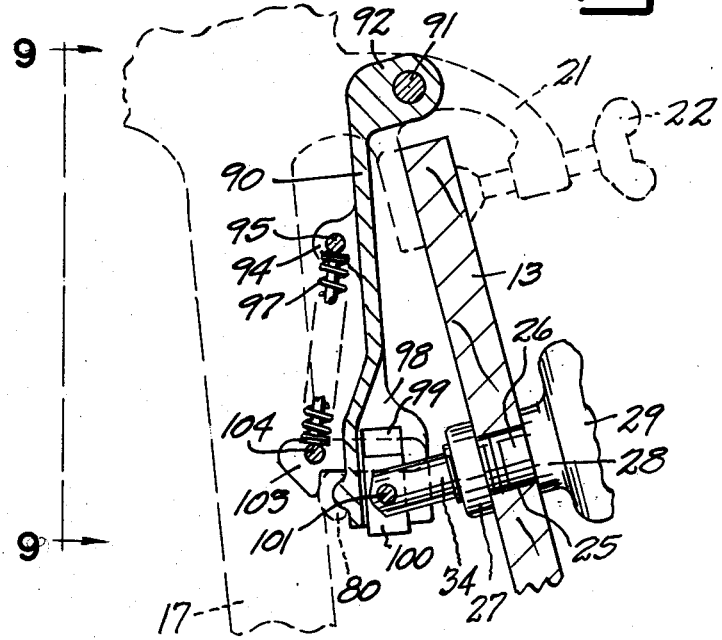
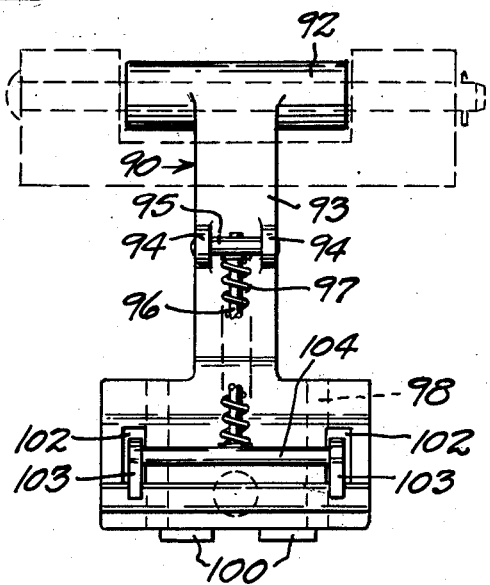
INVENTOR.
GEORGE D. HIXON
ATTORNEY

United States Patent Office 3,191,573
Patented June 29, 1965

3,191,573
OUTBOARD MOTOR MOUNTING DEVICE
George D. Hixon, South Bend, Ind., assignor of one-half to Eli Goloubow and one-fourth to David M. Feferman, South Bend, Ind.
Filed May 21, 1962, Ser. No. 196,265
5 Claims. (Cl. 115—41)

This invention relates to improvements in outboard motor mounting devices.

The primary object of this invention is to provide a device by means of which the attitude or position of an outboard motor can be varied, within a wide range relative to a boat on which the motor is mounted, while the boat travels so as to achieve optimum performance characteristics for any given condition or location of load in a boat, wind conditions or water surface conditions.

A further object is to provide a device of this character which is simple in construction, inexpensive to mnaufacture and install, which is sturdy and highly efficient for its intended purpose.

A further object is to provide a device of this character susceptible of application to boats propelled by a single outboard motor or to those propelled by dual or multiple outboard motors arranged side by side.

A further object is to provide a device of this character which can be adjusted from a position within the boat remote from the motor and which will maintain any adjustment in which it is set regardless of water conditions or any other normal operating condition.

A further object is to provide a device of this character with means permitting intentional tilting of the motor to accommodate shallow water conditions.

Other objects will be apparent from the following specification.

In the drawings:

FIG. 3 is a fragmentary perspective view of a part of the device with parts shown in section;

FIG. 4 is a vertical axial sectional view of the device illustrating its mounting upon the transom of a boat;

FIG. 8 is a fragmentary sectional view similar to FIG. 4 but illustrating a modified embodiment of the invention; and FIG. 9 is a view of a bracket as seen in the direction of the arrows 9 in FIG. 8.

Figure 1:
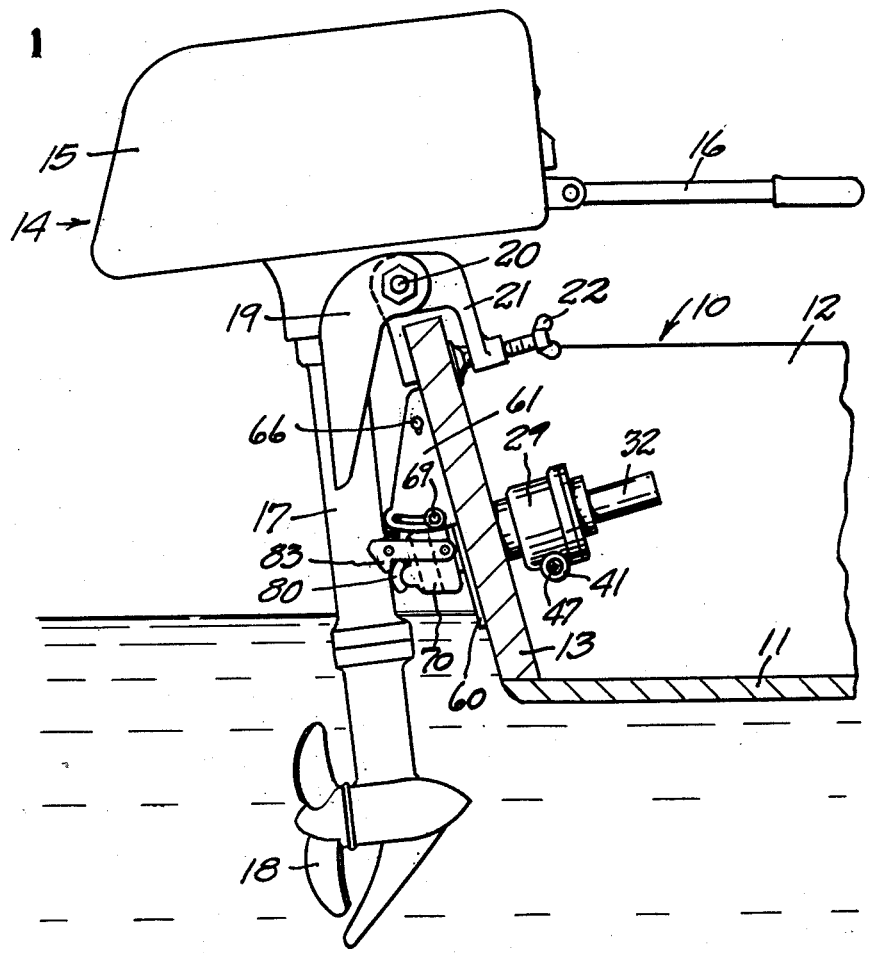
FIG. 1 is a view of the device mounting a motor upon the transom of a boat shown fragmentarily in section.

Referring to the drawings and patricularly to FIGS. 1 to 6 which illustrate one embodiment of the invention, the numeral 10 designates a boat of any suitable character and construction having a bottom 11, sides 12 and a transom 13. The numeral 14 designates an outboard motor of any suitable type and character and characterized by an engine 15, a control or tiller 16, an elongated substantially upright drive shaft housing 17, a propellor 18, and other usual elements and parts. The outboard motor also includes the usual mounting bracket 19 pivoted at 20 to a clamp structure 21 fitting loosely over the upper edge of the transom 13 and fixedly anchored to the transom by any suitable securing means, such as a clamping screw 22. The arrangement is such that the motor is mounted detachably upon the boat 10 and is permitted to swing or pivot about a horizontal axis transverse of the boat.

The transom of the boat has an aperture 25 therein vertically centered with the position of anchorage of the motor-mounting clamp upon the top part of the transom. A tubular bushing 26 has a snug and sealed or watertight fit in the aperture 25. The bushing 26 is preferably externally screw-threaded at its outer end to mount a nut 27. The opposite end of the bushing merges with an integral housing portion which preferably includes a shouldered part 28 adapted to bear against the inner face of the transom to position the bushing. If desired, gaskets or other sealing means may be interposed between the shoulder part 28 and the transom to seal against leakage around the bushing. The housing 29 is preferably cup-shaped. The housing 29 is closed by an end plate 30 secured detachably thereto by means of cap screws 31. End plate 30 has formed integrally therewith a tubular projection 32 concentric with the bushing 26 and removably mounting at its outer end a closure 33.

A shaft 34 is slidable endwise or fore and aft in the bushing 26. An annular seal 35, such as an O-ring, is preferably carried by the bushing and encircles the shaft. The portion of the bushing inwardly of the seal preferably has an enlarged diameter bore 36. The inner end portion of the shaft 34 is preferably screw-threaded at 37, said threaded portion being of substantial length as illustrated, namely approximately one-half the total length of the shaft. The threaded part 37 has a snug rotative fit within the enlarged bushing portion 36 and within the bore of the tubular projection 32. A worm gear 38 is mounted in the housing 29 and has a screw-threaded bore with which the threads 37 of the shaft 34 mesh. The end plate 30 preferably has an annular recess 39 within which a thrust bearing 40 is mounted, the same engaging the worm gear 38 to accommodate rotation thereof within the housing 29 while one end thereof bears against an abutment surface of said housing.

The gear housing 29 has a tangential apertured portion 41 within which are mounted bushings or sleeves 42 serving to journal the opposite end portions 43 of a shaft. Shaft 43 has an enlarged screw-threaded intermediate portion 44 positioned between the bushings 42 in a space communicating with the interior of the housing 29 so that said enlarged screw-threaded shaft part 44 meshes with the worm gear 38. The bushings 42 are preferably removably mounted, as by means of cap screws 45, and at least one of these bushings preferably has an enlarged tubular end portion 46 into which the outer end of the shaft 43 projects. The projecting shaft end portion is preferably reduced and non-circular, such as a squared or hexagonal end part, engageable detachably by the socketed end of an operating tool, such as a crank 48.

Figure 7:
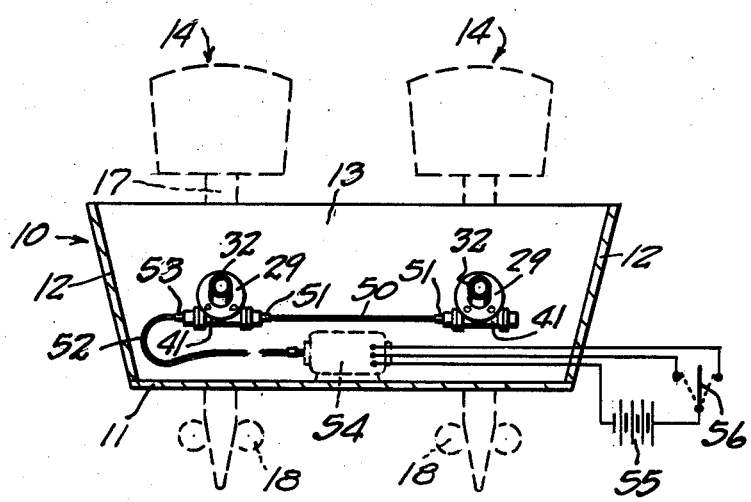
FIG. 7 is a vertical transverse sectional view of a boat illustrating two devices mounted therein to control the position of motors arranged in tandem at the rear of the boat.

In cases where two motors 14 are mounted side by side upon a boat transom 13, as illustrated in FIG. 7, so that the two housings 29 must be mounted in the transom, means may be provided to actuate the shafts 43 associated with the respective housings simultaneously and equally. In such an arrangement, a flexible shaft 50 may be provided with socket members 51 at its opposite ends, which socket members fit upon the reduced shaft end portions 47 of adjacent units so as to interconnect the shafts 43 of adjacent units for conjoint rotation. A second flexible shaft 52 may mount a socket 53 at one end, fitting upon the reduced end 47 of one of the shafts 43 of the two units. The shaft 52 may be rotated by any suitable means. Thus shaft 52 may be connected to a reversible motor 54 connected in a circuit with a battery or other source of power 55, which circuit is controlled by a reversing switch 56. It will be understood that power operation may also be effected where a single control unit is employed. It will also be understood that simultaneous operation and control of dual or multiple units may be effected manually by simply interconnecting the adjacent units, as by means of a flexible shaft 50, and then manually operating one of the units, as by means of a crank 48.

It will be apparent that by virtue of the threaded connection of the shaft part 44 with the worm gear 38 and the threaded connection between the worm gear 38 and the threaded part 37 of the shaft 34, a substantial power multiplication or speed reducing factor is provided between the shafts 43 and 34 which permits endwise movement of the shaft 34 against substantial operating resistance and which further serves to lock the shaft 34 in any selected longitudinal adjustment within the bushing 26 to maintain a setting of the shaft against displacement under stress.

A mounting plate or bracket 60 is secured to the boat transom 13 adjacent to the bushing 26 so as to project thereabove in substantially laterally centered relation with respect to the shaft 34. Bracket 60 has a pair of elongated vertical flanges 61, each having an elongated arcuate slot 62 at its lower end, and preferably having an elongated vertical slot 63 adjacent its upper end.

A swingable unit is carried by the bracket. As here shown this swingable unit includes a cross-shaft 65 having reduced end portions 66 slidable in the vertical slots 63. A pair of elongated rigid arms 67 depend from the cross-shaft 65 and are interconnected intermediate their height by a cross-bar 68. Pins 69 project from the arms 67 through the slots 62 to limit swinging of the arms. The lower end portions 70 of the arms 67 are enlarged and constitute walls connected by an offset cross-wall 71 preferably characterized by a transverse boss or rib 72. At their inner faces the walls 71 have vertical guide grooves 73.

One end of shaft 34 projects from the bushing 26 and has pivotally connected thereto, as by means of a cross-pin 75, a pair of slide members 76, each slidably seating in one of the guide grooves 73. The shaft 34 passes freely between the arms 67 below the cross-web 68. The sliding movement of the slide members 76 in the grooves 73 accommodates change in the vertical position of the pivot connection between the pivoted arms 67 and the shaft 34 as the arms swing from one position to another upon the cross-shaft 65.

The shaft housing 17 of the outboard motor 14 mounts an abutment member 80 which projects laterally from said housing at two sides thereof and is adapted to engage the transverse boss 72 of the cross-wall 71 at the lower end of the swinging unit. Thus the forward face of the member 80 is preferably concave and complementary to the convex face of the transverse boss 72. Means are provided for detachably locking the engine drive shaft housing 17 in predetermined relation to the arms 67 so as to maintain a contacting relation between the parts 72 and 80. Such means may constitute a pair of elongated hooks or latches having bars 81 each pivoted at one end at 82 to the lower portion 71 of the pivot arms 67, and each having at its free end a hook projection 83 engageable with the abutment 80 of the outboard motor drive shaft housing 17, so as to maintain the parts 70, 72 and 80 in locked relation. The free ends of the latch bars 81 are preferably connected by cross-member 84 to which is connected one or more spring guide rods 85 whose opposite ends may have a slide fit in apertures in cross-shaft 65. Expansion springs 86, such as coil springs, encircle each spring guide rod 85, each bearing at one end upon a washer or other abutment 87 engaging the cross-member 84 and at its opposite end upon a washer 88 engaging the cross-shaft 65.

The motor-positioning device forming the subject matter of this invention makes possible the control of the attitude or position of a motor mounted upon the transom of a boat while that motor is operating and the boat it propels is traveling through the water. This is done without change of the conventional mounting of the motor upon the boat and by the mounting of the positioning means upon the boat in proper relation to the point of connection of the motor to the boat transom. It further makes possible the ready mounting and dismounting of a motor without requiring substantial manipulation by the user, and it further makes possible tilting of the motor from a selected position if that is necessary as a result of travel of a boat in shallow water which causes the lower free end of the motor housing or the propeller 18 thereof to run aground or strike an obstacle.

The outboard motor 14 is mounted upon the boat by manipulation of the usual mounting clamp arrangement 21, 22 to support the weight of the outboard motor upon the boat transom, while at the same time permitting the motor shaft 17 and related parts to pivot about the transverse horizontal axis 20. The angular relation of the drive shaft housing 17 of the motor with respect to the transom of the boat is maintained by holding its abutment 80 in engagement with the transverse boss 72 and locking the parts in this relation by causing the hook projections 83 of the latches pivoted at 82 to the arms 67 to engage behind the abutment 80. Ready disconnection of the outboard motor from the boat can be effected by releasing the engagement of the hook projections 83 with the abutment 80 on the drive shaft housing to permit the drive shaft housing to be swung about the pivot axis 20 and out of engagement with the positioning means followed by disconnection of the mounting hook assembly 21, 22.

Figure 2:
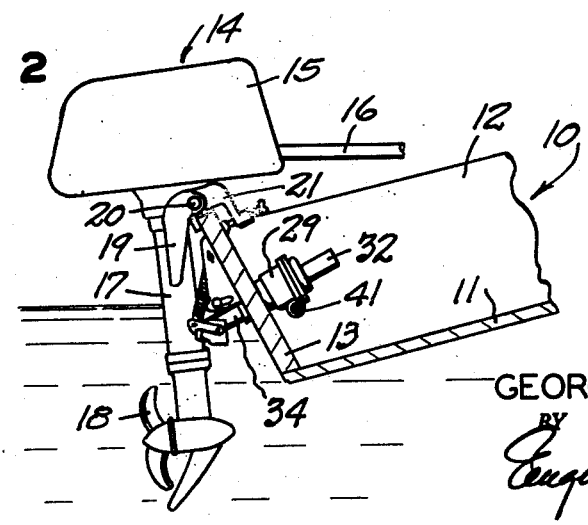
FIG. 2 is a side view of the device mounting the motor and adjusted at a different position or relation to the boat.

The positioning device makes possible change of the angular relation between the transom 13 and the drive shaft housing 17 while the boat travels through the water. Such change in relationship is frequently required as wind conditions or water surface conditions vary, or as the load in a boat is shifted from time to time. Such changes may also be necessitated as the speed of operation of the boat is changed. Thus in any given boat, loaded in a particular maner, the position in which the boat rides in the water will be different at low speed, for example, a speed of three or four miles per hour, than at a high speed at which a boat tends to plane in the water, as when racing or when towing water skiers. Two different angular positions which the boat may assume in the water are illustrated in FIGS. 1 and 2. Variation of the angular position of the boat in the water produces a variation in the operating efficiency of the outboard motor because it changes the angular position of the axis of rotation of the propeller with respect to the direction of travel of the boat and with respect to the surface of the water.

The present device permits adjustment of the angular position of the motor drive shaft to accommodate the most efficient positioning or attitude of the motor and the propeller relative to the direction of travel. Thus it will be apparent that, if a motor which operating to propel a boat which is normal to the water surface as illustrated in FIG. 1 is accelerated in a manner to cause the boat to assume a tilted position, as illustrated in FIG. 2, it may be advisable to change the position of the propeller relative to the direction of travel, for example, to change the position of the motor to that shown in FIG. 2.

Figure 5:
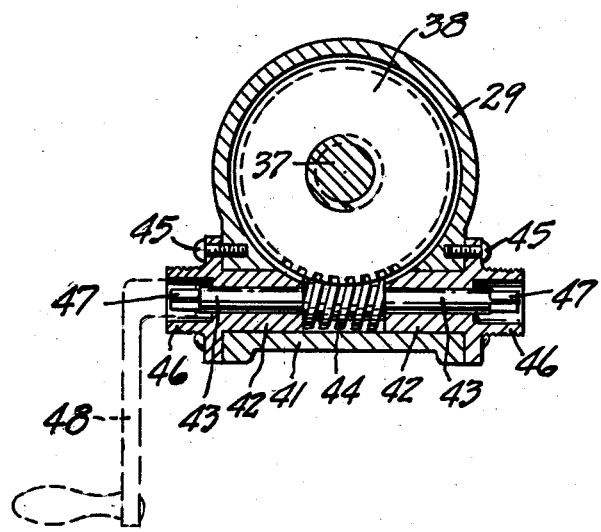
FIG. 5 is a transverse sectional view taken on line 5—5 of FIG. 4.
Figure 6:
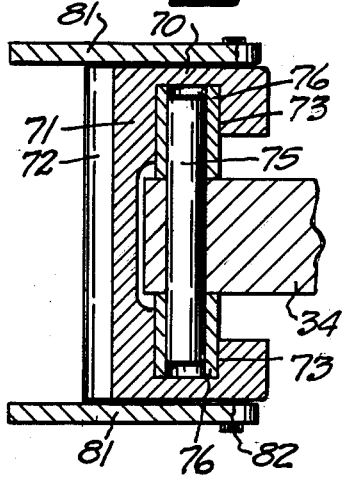
FIG. 6 is a fragmentary detail sectional view taken on line 6—6 of FIG. 4.

Operation of the device to control the attitude or position of the motor is effected by rotating the threaded shaft 43 by any suitable means whereby rotation of the worm gear 38 is produced. Rotation of the worm gear 38 produces axial advance of the shaft 34 which is held against rotation by the engagement of the slide members 76 carried thereby with the guide grooves 73. Consequently, the direction and extent of axial movement of the shaft 34 will depend upon the direction and extent of rotation of the worm gear 38. It will be observed that there is a speed reduction between the rotation of the shaft 43 and the worm gear 38 and that there is a further speed reduction between the rotation of the worm gear 38 and the shaft 34. Consequently, adequate power is developed to permit manual operation as by means of a crank 48, as seen in FIG. 5, in a manner to effectively resist the forces at work incident to the reaction of the water against the device even at high speed travel. Furthermore, this speed reduction insures that the adjustment will be sufficiently gradual to permit the operator to observe the effect of changes of the position of the motor and to determine when a position or setting providing optimum efficiency and performance is reached. The longitudinal or axial movement of the shaft 34 will cause the swingable unit which carries the motor drive shaft 17 to be pivoted about the cross-shaft 65. Such movement of the swingable unit causes the outboard motor to pivot about the axis 20 and thus varies the angular relation between the motor drive shaft 17 and the transom of the boat 13. The difference in the direction of movement of the axially shiftable shaft 34 and the swingable grooved part 70 of the arms 67 is accommodated by the sliding of the slide members 76 in the grooves 73.

The modified embodiment of the invention illustrated in FIG. 8 entails the use of a swingable unit 90 pivoted at 91 at an elongated transverse boss 92. The casting 90 is preferably narrow at the central portion 93 thereof and is provided with ears 94 connected by a pivot pin 95 having a central aperture therethrough within which is slidable a guide rod 96 encircled by a coil spring 97. The lower end portion of the casting has opposed projecting side walls 98 provided with guide grooves 99 receiving slide members 100 pivoted at 101 to the end of the shaft 34 of the character and construction previously described. The lower casting part preferably has a pair of apertures 102 therein through which extend the shanks of hook members 103 whose outer free ends are connected by a cross-bar 104 to which the guide rod 96 is connected. The hooks 103 are pivoted to the side walls 98 and extend with clearance through the apertures 102 in such a manner as to permit sufficient swinging of said hooks to engage and disengage abutment members 80 from the motor drive shaft housing 17.

This construction accomplishes the same result and functions in the same manner as the construction illustrated in FIGS. 1 to 6, as described above. The construction differs principally in the location of the pivot 91 of the swingable unit 90 relative to the top of the transom 13 of the boat and with respect to the use of a single unit spring 97 to act upon the two hook members 103. Also, the specific shape of the swingable unit is different than that in the first form, and the use of a bracket or plate as shown in the first form is omitted or eliminated.

While the preferred embodiments of the invention have been illustrated and described, it will be understood that changes in construction may be made within the scope of the appended claims without departing from the spirit of the invention.

I claim:
1. A device for positioning an outboard motor pivotally mounted on the transom of a boat, comprising
 a tubular member adapted to be mounted fixedly on and to extend through an opening in said boat transom,
 an elongated member slidable endwise in said tubular member,
 screw-threaded means for advancing and retracting said elongated member in said tubular member,
 a member mounted to swing on a shaft mounted transversely on said transom above said elongated member, means slidably mounted on said swinging member and connected to said elongated member, and
 latch means for releasably connecting said outboard motor to said swinging member.

2. A device for positioning an outboard motor pivotally mounted on the transom of a boat, comprising
 a tubular member adapted to be mounted fixedly on and to extend through an opening in said boat transom,
 an elongated member slidable endwise in said tubular member,
 screw-threaded means for advancing and retracting said elongated member in said tubular member,
 a member adapted to swing relative to said transom on an axis transverse of and spaced from said elongated member,
 means including a part slidable on said swinging member for connecting said elongated member to said swinging member, and
 latch means for releasably connecting said outboard motor to said swinging member.

3. A device for positioning an outboard motor pivotally mounted on the transom of a boat, comprising
 a tubular member adapted to be mounted fixedly on and to extend through an opening in said boat transom,
 an elongated member slidable endwise in said tubular member,
 means for advancing and retracting said elongated member in said tubular member,
 a member mounted to swing on a shaft mounted transversely of said transom above said elongated member, means slidably mounted on said swinging member and connected to said elongated member,
 latch means for releasably connecting said outboard motor to said swinging member,
 said elongated member including a screw-threaded part, and
 said advancing means including a member rotatably carried by said tubular member and having a threaded bore mating with said screw-threaded part.

4. A device for positioning an outboard motor pivotally mounted on the transom of a boat, comprising
 a tubular member adapted to be mounted fixedly on and to extend through an opening in said boat transom,
 said tubular member including an inner housing part,
 a worm gear journaled in said housing part and having a screw-threaded bore centrally therein,
 a shaft slidable endwise in said tubular member and having a threaded part mating with said threaded gear bore,
 means for rotating said gear,
 a member mounted to swing on a shaft mounted transversely of said transom above said elongated member, means slidably mounted on said swinging member and connected to said elongated member, and
 latch means for releasably connecting said outboard motor to said last named swingable member.

5. A device for positioning an outboard motor pivotally mounted on the transom of a boat, comprising
 a tubular member adapted to be mounted fixedly on and to extend through an opening in said boat transom,
 said tubular member including an inner housing part,
 a worm gear journaled in said housing part and having a screw-threaded bore centrally therein,
 a shaft slidable endwise in said tubular member and having a threaded part mating with said threaded gear bore,
 means for rotating said gear,
 a member mounted and swingable on said transom and having elongated guides extending transverse relative to said shaft, slide members carried by said shaft and shiftable along said guides, and means for detachably connecting said outboard motor to said swingable member.

References Cited by the Examiner

UNITED STATES PATENTS

| | | | |
|---|---|---|---|
| 2,446,528 | 8/48 | Clark | 244—102 X |
| 2,822,899 | 2/58 | Tromanhauser | 115—41 X |
| 2,893,342 | 7/59 | Langford | 115—41 |
| 2,927,552 | 3/60 | Mickey | 115—41 |
| 2,928,631 | 3/60 | Hartman | 115—41 X |
| 2,997,014 | 8/61 | Puckett | 115—41 X |
| 3,091,211 | 5/63 | Hansen | 115—41 |

MILTON BUCHLER, *Primary Examiner*.